(12) United States Patent
Schlittler et al.

(10) Patent No.: US 10,912,408 B2
(45) Date of Patent: Feb. 9, 2021

(54) APPARATUS FOR PRODUCING A BEVERAGE FROM A CAPSULE

(71) Applicant: MoCoffee Europe Unipessoal, Lda, Lisbon (PT)

(72) Inventors: Pascal Schlittler, Meilen (CH); Marco Miranda, Renens (CH); Vincent Nanchen, Grone (CH); Blaise Russi, Venthone (CH)

(73) Assignee: MoCoffee Europe Unipessoal, Lda, Lisbon (PT)

( * ) Notice: Subject to any disclaimer, the term of this patent is extended or adjusted under 35 U.S.C. 154(b) by 350 days.

(21) Appl. No.: 15/760,607

(22) PCT Filed: Sep. 16, 2016

(86) PCT No.: PCT/EP2016/071987
§ 371 (c)(1),
(2) Date: Mar. 15, 2018

(87) PCT Pub. No.: WO2017/046338
PCT Pub. Date: Mar. 23, 2017

(65) Prior Publication Data
US 2018/0255959 A1  Sep. 13, 2018

(30) Foreign Application Priority Data

Sep. 17, 2015  (EP) ..................................... 15185760

(51) Int. Cl.
*A47J 31/36* (2006.01)
*A47J 31/06* (2006.01)

(52) U.S. Cl.
CPC ....... *A47J 31/3695* (2013.01); *A47J 31/0673* (2013.01); *A47J 31/369* (2013.01)

(58) Field of Classification Search
CPC .... A47J 31/0673; A47J 31/36; A47J 31/3623; A47J 31/3628; A47J 31/3695
See application file for complete search history.

(56) References Cited

U.S. PATENT DOCUMENTS 4,834,141 A * 5/1989 Frisch ....................... F16K 1/32
                                                    137/625.27
7,650,831 B2 * 1/2010 Denisart ............. A47J 31/3695
                                                    99/283

(Continued)

FOREIGN PATENT DOCUMENTS

CN        202553556 U  * 11/2012  .......... A47J 31/3633
CN        202604567 U  * 12/2012

(Continued)

*Primary Examiner* — Jacob J Cigna
(74) *Attorney, Agent, or Firm* — The Watson IP Group, PLC; Jovan N. Jovanovic

(57) ABSTRACT

An apparatus for preparing a beverage from capsules, including a liquid supply system comprising a water reservoir and a pump, an extraction block comprising an injection block including an injector head and a housing, and an extraction mechanism comprising a capsule holder configured to receive a capsule. The injector head comprises an injection plate having plurality of inlet injectors with internal liquid channels configured to pierce through a lid of a capsule. The injector head comprises a water inlet connected to the water reservoir and an actuating mechanism configured to displace the injector head between an open position whereby the capsule can be inserted or removed from the extraction block to a closed position whereby the injector head is sealingly closed against the capsule holder.

14 Claims, 9 Drawing Sheets

(56) References Cited

U.S. PATENT DOCUMENTS

| | | | |
|---|---|---|---|
| 8,770,095 B2* | 7/2014 | Pecci | A47J 31/3633 |
| | | | 99/295 |
| 2005/0160919 A1 | 7/2005 | Balkau | |
| 2006/0225575 A1* | 10/2006 | Denisart | A47J 31/3695 |
| | | | 99/275 |
| 2009/0250491 A1* | 10/2009 | Erman | A47J 31/402 |
| | | | 222/135 |
| 2010/0037779 A1* | 2/2010 | Pecci | A47J 31/3628 |
| | | | 99/289 R |
| 2012/0199011 A1* | 8/2012 | Cheng | A47J 31/3695 |
| | | | 99/295 |
| 2016/0360919 A1* | 12/2016 | Burrows | A47J 31/3628 |

FOREIGN PATENT DOCUMENTS

| | | | | |
|---|---|---|---|---|
| CN | 202619402 U | * | 12/2012 | ......... A47J 31/3633 |
| CN | 202858855 U | * | 4/2013 | |
| CN | 103371725 A | * | 10/2013 | |
| CN | 203539114 U | * | 4/2014 | |
| EP | 2520203 A1 | * | 11/2012 | ......... A47J 31/3633 |
| GB | 2499004 A | | 7/2013 | |
| WO | WO-2010029514 A1 | * | 3/2010 | ......... A47J 31/0673 |
| WO | WO-2015168824 A1 | * | 11/2015 | ......... A47J 31/3633 |

\* cited by examiner

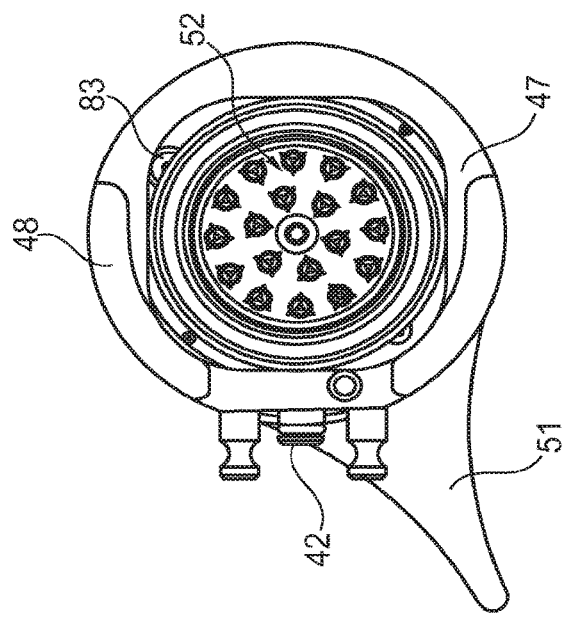
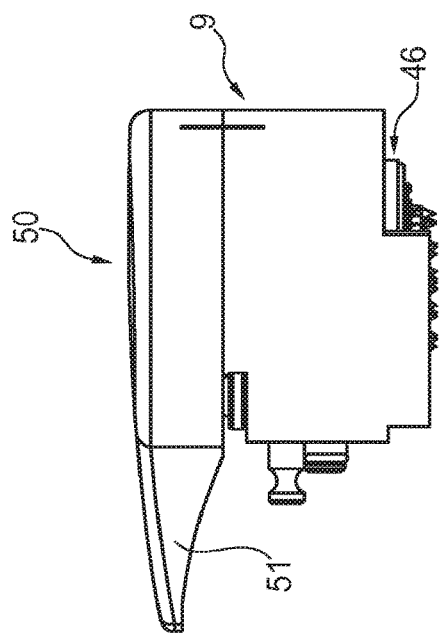
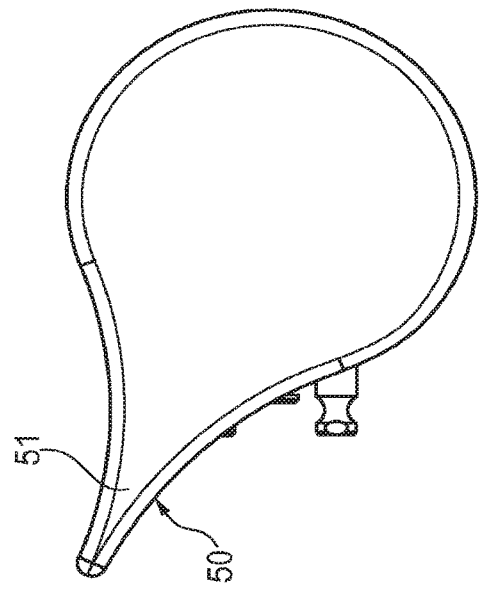
Fig. 3b
Fig. 3a
Fig. 3c

APPARATUS FOR PRODUCING A BEVERAGE FROM A CAPSULE

FIELD OF THE INVENTION

The present invention relates to an apparatus for producing a beverage by injection of a pressurized liquid into a capsule.

BACKGROUND

Machines for preparing a beverage by injecting hot water under pressure into a capsule containing a beverage producing substance such as ground coffee, and collecting the extracted liquid, are well known. Brewing machines typically have a capsule holder adapted for receiving the capsule, an injector head that sealingly closes over the capsule holder for injecting hot water into the capsule, and an extraction outlet on an opposite side of the capsule holder for the outflow of the brewed liquid. Many known systems have hermetically closed capsules that are perforated by the injector head when the injector head closes over the capsule holder, and further have perforation elements at the extraction side to perforate the capsule bottom side to allow outflow of the brewed liquid.

After preparation of a beverage from a capsule, the injector head opens away from the capsule holder and the capsule can be removed or ejected from the capsule holder to allow a new capsule to be inserted for preparation of a new portion of beverage.

There may remain some water drops on the capsule top or on the injector head when it is opened at the end of a beverage preparation cycle. Also, the capsule holder extraction outlet or the outer extraction side of the capsule typically holds some residual brewed liquid that drops off when the capsule holder is opened or when a new capsule is inserted. Beverage making machines are normally provided with containers positioned under the outlet and under the injector head to collect the drops of water and brewed liquid that fall without a cup in place. This however requires cleaning of the collection containers. Moreover, dripping water or beverage is often perceived by users of such machines as undesirable in view of the need to clean or wipe away drops that fall on the user's hand, side of the cup or on objects that pass under the extraction outlet.

Another disadvantage of conventional brewing machines presenting piercing means adapted for piercing through part of said capsules, is either the complexity of capsule ejection means, or a risk of the capsule being stuck or difficult to remove from the capsule holder of the extraction block.

SUMMARY OF THE INVENTION

It is an object of the present invention to provide an apparatus for producing a beverage which remains clean and is easy and convenient to use.

It is advantageous to provide an apparatus for producing a beverage which allows easy and simple removal of a used capsule.

It is advantageous to provide an apparatus for producing a beverage which is compact.

It is advantageous to provide an apparatus for producing a beverage which is reliable.

It is advantageous to provide an apparatus for producing a beverage which is cost effective to manufacture.

Objects of the invention have been achieved by the apparatus for producing a beverage according to claim 1. Various advantageous features of the invention are set forth in the dependent claims.

Disclosed herein is an apparatus for preparing a beverage from capsules, including an extraction block comprising an extraction mechanism comprising a capsule holder configured to receive a capsule, and an injection block comprising a movable injector head mounted in a housing and an actuating mechanism configured to displace the injector head between an open position whereby the capsule can be inserted or removed from the extraction block to a closed position whereby the injector head is sealingly closed against a capsule received in the capsule holder.

The apparatus may further include a pump and a liquid supply system comprising a water reservoir connected to the injection block via a water inlet in the housing, the injector head comprising an injection plate having plurality of inlet injectors with internal liquid channels configured to pierce through a lid of a capsule.

According to a first aspect of the invention the pump comprises a pump chamber and is configured to draw liquid from the water reservoir into the pump chamber via a first conduit comprising a valve preventing liquid in the pump chamber from flowing back to the water reservoir, and is further configured to supply the water in the pump chamber to the inlet injectors via a valveless second conduit fluidly connecting an outlet of the pump chamber to the water inlet such that during a pump chamber filling operation an under-pressure in the inlet injectors is created. The under-pressure withdraws liquid drops at the end of the beverage preparation cycle such that the machine does not drip when a used capsule is removed.

According to a second aspect of the invention, the injector head comprises a switchable inlet channel having a first opening arranged to receive liquid from the water inlet and a second opening arranged to supply liquid from first opening to the inlet injectors, wherein in the closed position the water inlet is in liquid communication with the switchable inlet channel, and in the open position the switchable inlet channel is not in liquid communication with the water inlet, and the water inlet is sealingly closed.

In an embodiment, a sealing ring may be provided around the water inlet channel at an interface with the injector head, such that when the injector head is in the open position, the sealing ring presses sealingly against a closed surface of the injector head to thereby close the water inlet. In the closed position the sealing ring presses sealingly against the surface of the injector head surrounding the switchable inlet channel such that a sealed coupling between the water inlet and switchable inlet channel is provided.

According to a third aspect of the invention, the apparatus comprises a capsule disengaging mechanism configured to engage a rim of the capsule and lift up the capsule when the movable injector head and capsule holder move from a closed position to an open position. The capsule disengaging mechanism comprises a clasp fixed to the injector head configured to interfere with an outer edge of the capsule rim and deform the capsule rim during closing of the injector head. The clasp is configured to lift up the capsule and is further configured to disengage from the capsule due to the deformation of the flexible capsule rim as the clasp is lifted away with the injector head.

In an embodiment, a sealing ring is received in a slot in the injector head and vertically aligned with the ridge of the capsule holder, the sealing ring comprising a double lip facing the capsule lid.

In an embodiment, the capsule holder has a rim configured to support the underside of the capsule rim, the rim of the capsule holder comprising an inner annular portion shaped as a ridge abutting against the underside of the capsule rim.

In an embodiment, the ridge has a rounded upper surface.

In an embodiment, the sealing ring is placed vertically above the ridge.

In an embodiment, the rim of the capsule holder is removably received in a guide slot of the housing of the injection block.

In an embodiment, the pump is a piston pump comprising a reciprocating piston arranged within a cartridge enclosing the pump chamber.

In an embodiment, a one-way valve is arranged in the first conduit to prevent the liquid in the pump chamber from flowing back to the water reservoir.

In an embodiment, a liquid distribution chamber is arranged in the injector head adjacent the injection plate, the chamber configured to distribute liquid to the inlet injectors.

In an embodiment, the clasp comprises a leading edge configured to interfere with an outer edge of the capsule rim and to deform the capsule rim to enable the clasp to slide past and under said outer edge such that a trailing edge of the clasp engages an underside of the capsule rim outer edge.

In an embodiment, the clasp is formed on a head at a free end of a shaft.

In an embodiment, the shaft is inserted in a fixing cavity of the injector head, wherein the head is axisymmetric such that the shaft may be inserted in the cavity without needing to consider the rotational angle of the shaft. The leading edge may advantageously be conically shaped.

In an embodiment, the housing comprises a flange which restricts disengagement movement of the capsule while the capsule holder is mounted to the injection block such that when the moveable block opens away from the capsule holder the capsule lifts up and abuts the flange and the clasp disengages from the capsule due to the deformation of the flexible capsule rim.

In an embodiment, an upper rim of the capsule holder has an inner annular portion connected to an inner side wall of the capsule holder and a mid annular portion extending radially outwards of the inner annular portion, the inner annular portion comprising a ridge protruding in an axial direction of the capsule holder configured to abut the underside of the capsule rim. The mid annular portion has a surface located at a height lower than the height of the ridge such that when a capsule is placed in the capsule holder, the capsule rim is not in contact with the mid annular portion.

In an embodiment, a difference in height between the mid annular portion and the ridge of the capsule holder is greater than an axial height of a clasp in order to allow the clasp to be positioned in the space formed under the outer edge of the capsule rim.

In an advantageous embodiment, the capsule disengaging mechanism comprises a pair of clasps on diametrically opposite sides of the injector head.

In an advantageous embodiment, a radial position of the clasp from the centre axis of the capsule holder corresponds to an outer radius of the capsule rim less an interference amount configured for an interference engagement of the clasp with the rim, the interference amount in the range of between 0.3 mm and 2 mm, preferably in a range of between 0.4 mm and 1 mm, more preferably in a range of between 0.4 and 0.8 mm.

Further objects and advantageous features of the invention will be apparent from the claims, from the detailed description, and annexed drawings.

BRIEF DESCRIPTION OF THE DRAWINGS

The invention will now be described in more detail with reference to the accompanying drawings, which by way of example illustrate the present invention and in which:

FIG. 3a is a side view of an injection block according to an embodiment of the invention, FIG. 3b is a bottom view of an injection block of FIG. 3a;

FIG. 3c is a top view of the injection block of FIG. 3a;

FIGS. 5a and 5b are schematic cross sectional detail views of the capsule rim of the capsule holder of FIG. 4a;

DETAILED DESCRIPTION OF EMBODIMENTS

Figure 1A:
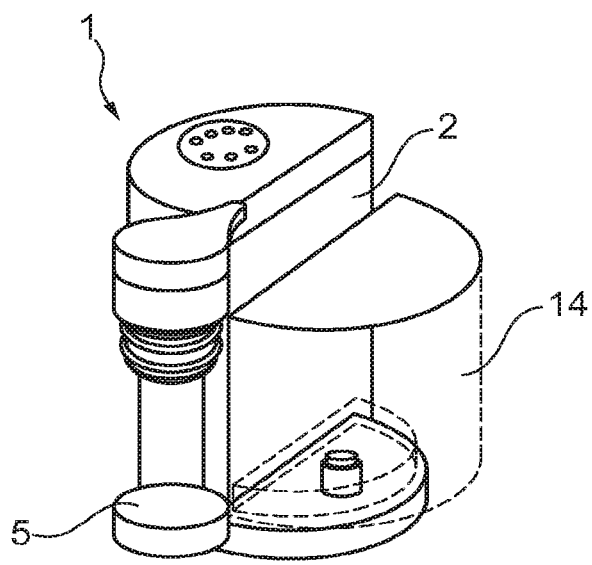
FIGS. 1a and 1b are schematic perspective views of an exemplary apparatus according to an embodiment of the invention.
Figure 1B:
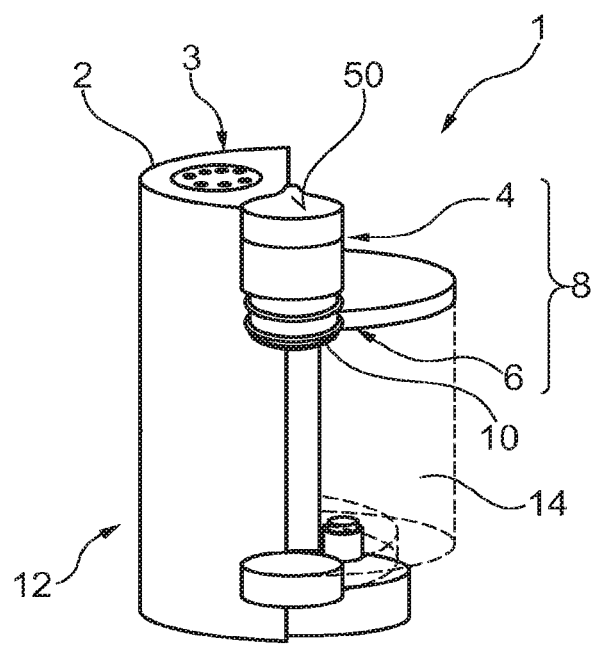

Referring to the drawings, and in particular to FIGS. 1a and 1b, an apparatus for producing a beverage 1 according to an embodiment of the invention is illustrated. The apparatus for producing a beverage 1 comprises a main body 2, an extraction block 8 and a liquid supply system 12. The present apparatus for producing a beverage 1 is configured to receive a capsule 26 in the extraction block 8, to pierce the capsule 26 and to inject liquid through the interior of the capsule and to extract the beverage from the capsule 26. The apparatus for producing a beverage 1 is suitable for receiving capsules 26 containing a substance with water soluble beverage products, for instance ground coffee, powder chocolate, tea, bouillon, and the like. The capsule may be a hermetically closed capsule comprising a sidewall 25, a rim 32 and a lid 30. The capsule may be made of various food compatible materials, for instance based on polymers or metals such as aluminium or cellulose based materials, with wall thicknesses sufficiently thin to be perforated by injection points of the apparatus during use.

The extraction block 8 comprises a liquid injection mechanism 4, and an extraction mechanism 6. The liquid injection mechanism 4 is configured to inject liquid into the capsule 26, while the extraction mechanism 6 is configured to extract the drink from the capsule 26.

The injection mechanism 4 comprises an injection block 9, comprising an injector head 28 movably mounted in a housing 40. The injector head comprises an injection plate 27 provided with a plurality of inlet injectors 34 configured to pierce through the lid 30 of the capsule 26 and to inject liquid directly into the interior of the capsule 26. Preferably, the inlet injectors 34 are configured as spikes with a sharp tip 29 configured for piercing through the lid of the capsule, where each of the spikes has an internal channel 37. The injector head 28 is configured to be moved towards and away from the capsule holder 10, for instance in a linear movement in an axial direction Ach, when mounted to the injector head. When a capsule is positioned in the capsule holder, the injector head engages and disengages the injection plate 27 with the lid 30 of the capsule 26.

Figure 2A:
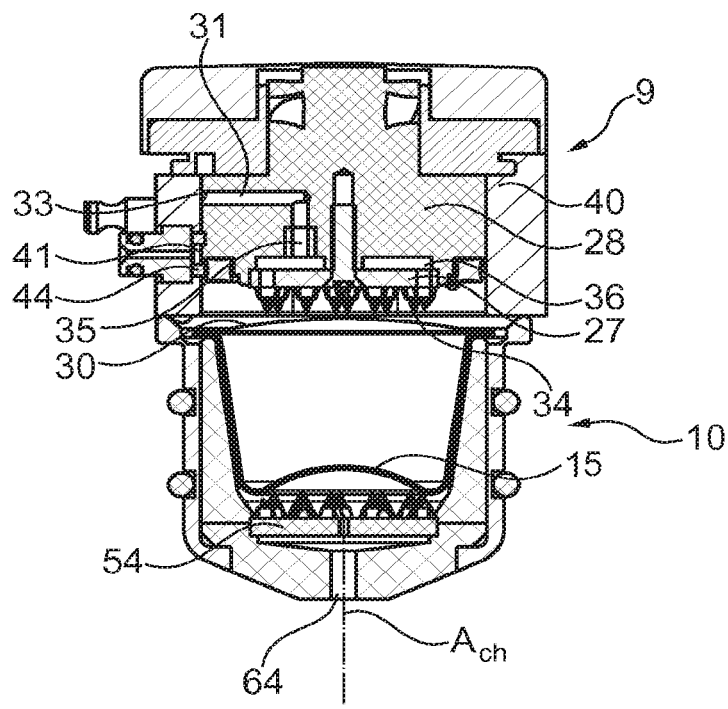
FIG. 2a is a cross-sectional view of an extraction block in an open position according an embodiment of the invention.

As illustrated in FIGS. 2a to 2e, the inlet injectors 34 receive inlet liquid from a switchable inlet channel 31 in the injector head 28. The switchable inlet channel 31 has a first end opening 33 configured as a water inlet into the injector head 28 and a second end opening 35 configured as a downstream outlet to a distribution chamber 36 arranged within the injector head 28 adjacent the injection plate 27 and wherein the distribution chamber is directly fluidically connected to the internal channels 37 of the inflow injectors 34. The housing 40 has a water inlet 42 connected to an upstream water reservoir 12, a sealing ring 44 arranged between a lateral surface 41 of the injector head 28 and the housing 40 at the position of the water inlet 42. When the injector head is in the open (retracted) position as shown in FIG. 2a, the sealing ring presses sealingly against a closed portion of a lateral surface 41 of the injector head to thereby close the water inlet. in the closed position shown in FIG. 2b, the sealing ring presses sealingly against the lateral surface of the injector head surrounding the switchable inlet channel such that a sealed fluidic coupling between the water inlet 42 and switchable inlet channel 31 is formed.

The injector head 28 is operatively connected to an actuating mechanism 50. The purpose of the actuating mechanism 50 is to achieve an axial movement of the injector head 28 inside the housing 40. In the illustrated embodiment, the actuating mechanism 50 comprises a lever 51, which for instance may be rotatably connected to the injector head 28 via a coupling that converts the rotation movement of the lever to axial translation of the injector head, for instance via a thread and groove mechanism or a bayonet type of coupling. In this embodiment, when rotating the lever 51 is rotated from the open to the closed position, the injector head 28 moves towards the lid 30 of the capsule, and when rotating the lever 51 turns in an opposite direction, the injector head 28 retracts inside the housing 40.

The position of the injector head 28 in relation to the housing 40 governs the water supply to the injection head 9. The position of the first end opening 33 of the switchable inlet channel 31 in the injector head 40 in relation to the water inlet 42 of the housing 40 determines the opening and closing of the water supply to the distribution chamber 36 and the inlet injectors 34. FIG. 2a illustrates when the extraction block 8 is in an open position, i.e. a position when the injector head 28 is located in its most retracted position inside the housing 40, whereby the injection plate 27 is disengaged from the capsule 26. In the open position, the switchable inlet channel 30 and the water inlet 42 are not aligned, whereby the water supply to the injection head 28 is closed.

Figure 2B:
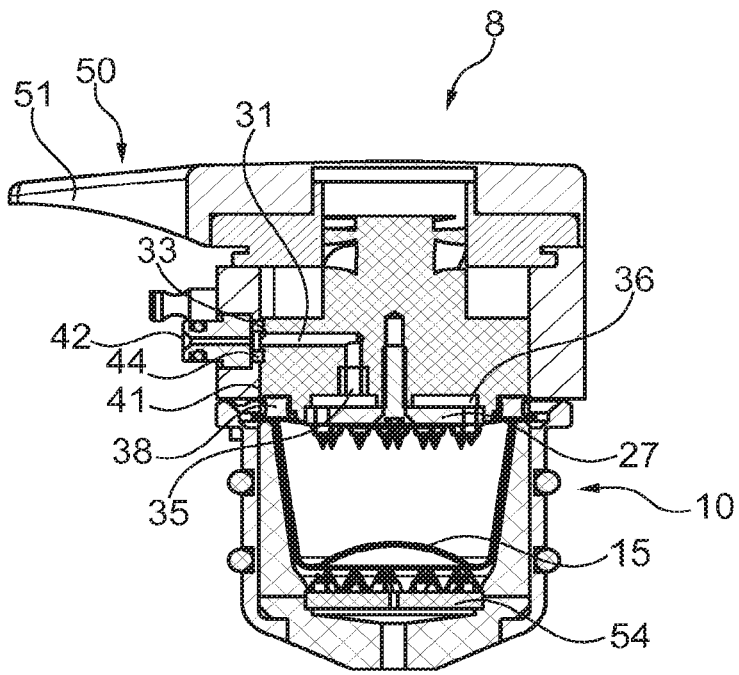
FIG. 2b is a cross-sectional view similar to FIG. 2a showing the extraction block in a closed position before injection of liquid into the capsule.
Figure 2C:
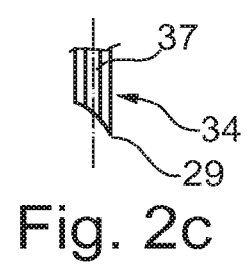
FIG. 2c is a schematic view of an inflow injector of an extraction block according to an embodiment of the invention.
Figure 2D:
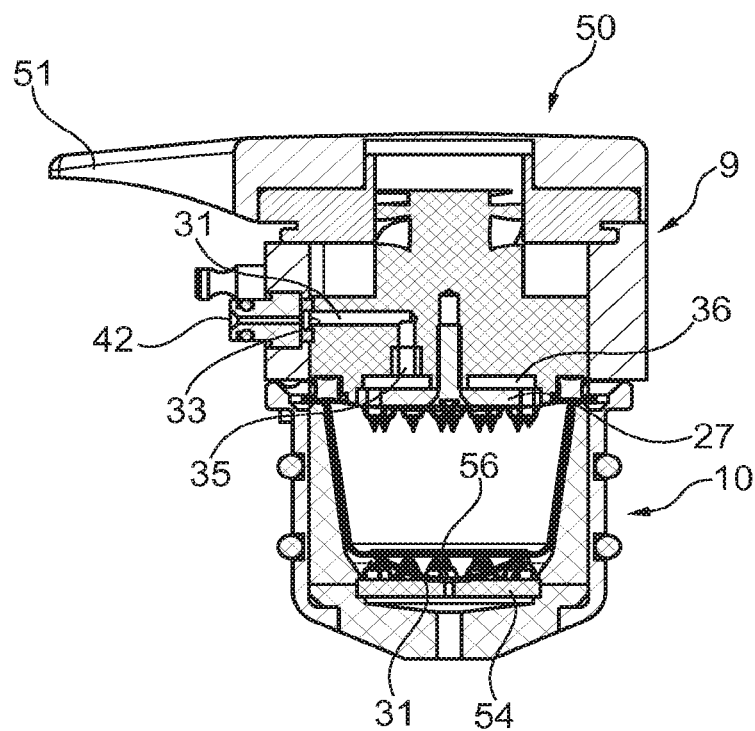
FIG. 2d is a cross-sectional view similar to FIG. 2a showing the extraction block in a closed position during liquid injection into the capsule.
Figure 2E:
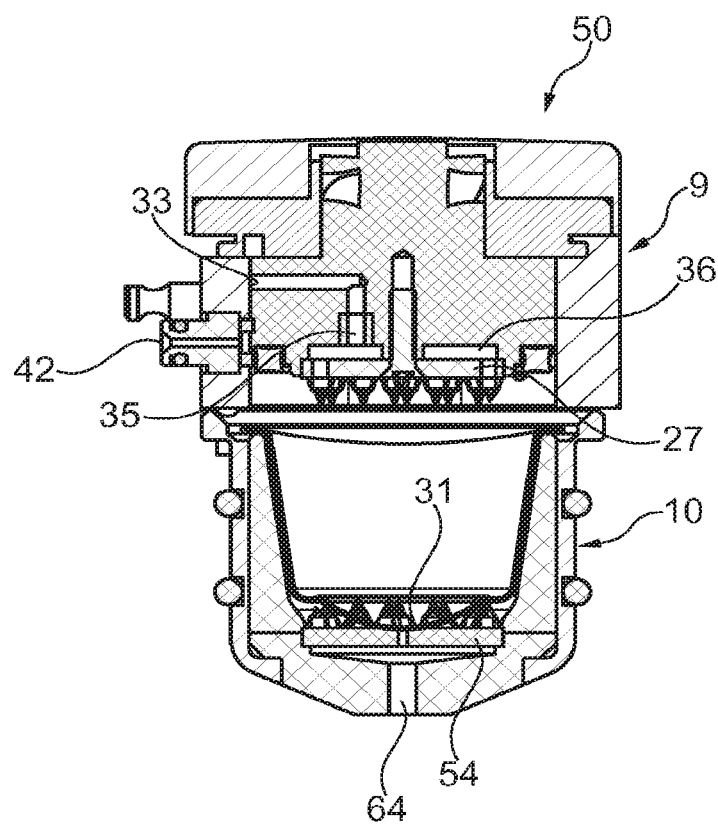
FIG. 2e is a cross-sectional view similar to FIG. 2a showing the extraction block in an open position after the injection of liquid into the capsule.

FIG. 2b illustrates when the extraction block is in a closed position, i.e. a position when the injector head 28 is located in its most outwardly extended position with respect to the housing 40, whereby the injection plate 27 engages the lid 30 of the capsule 26, such that the inlet injectors 34 extend through the capsule lid 30. In the closed position, the first end opening 33 of the switchable inlet channel 30 and the water inlet 42 are aligned, such that liquid from the liquid supply system 12 can be supplied from the first end opening 33 and further into the interior of the capsule 26. Hence, the axial position of the injector head 28 has a valve function.

The extraction mechanism 6 comprises a capsule holder 10 which may be removably mounted to the housing 40 of the injection head 9. The user can remove the capsule holder from the injection head 9, replace a used capsule by placing a new capsule 26 in the capsule holder 10 and connect the capsule holder 10 to the housing 40 again.

Figure 4A:
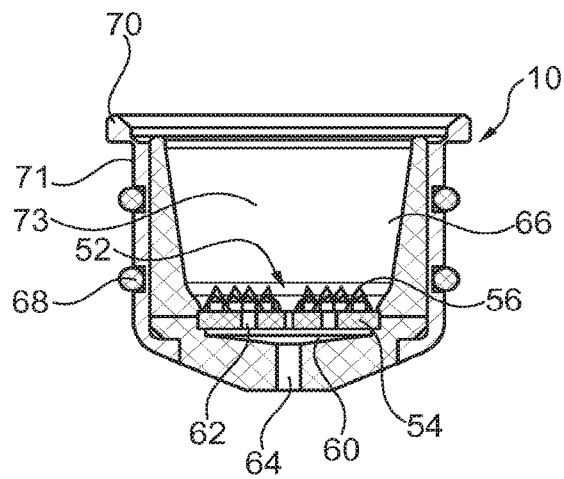
FIG. 4a is a cross-sectional view, FIG. 4b a side view, FIG. 4c a top view and FIG. 4d views of a perspective view of an exemplary capsule holder according to an embodiment of the invention.
Figure 4C:
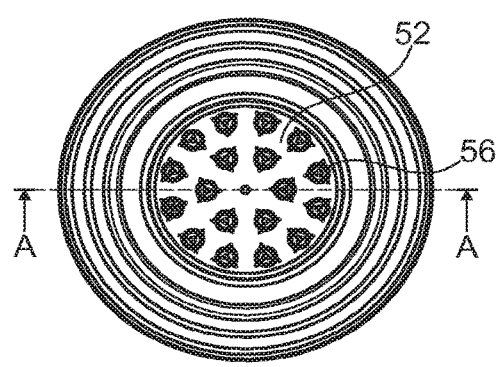
Figure 4B:
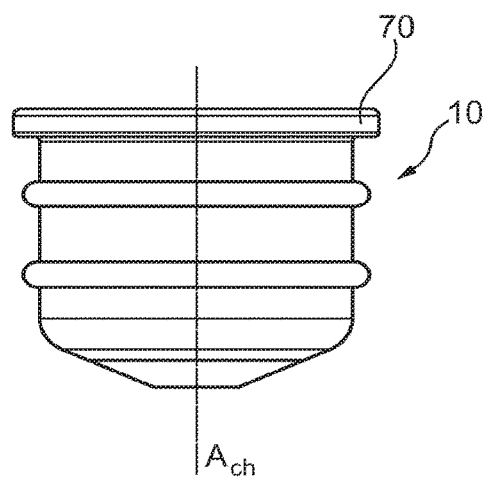
Figure 4D:
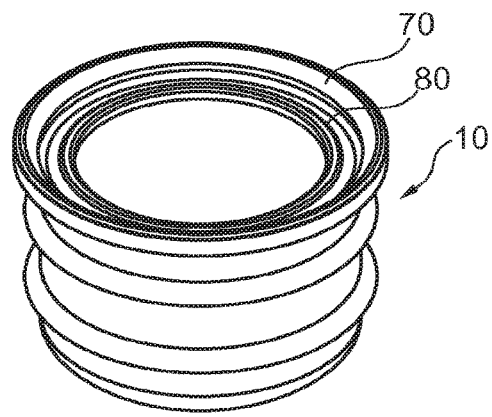

As best seen in FIGS. 4a to 4d, the capsule holder 10 has a cup-like shape with an upper rim 70, internal side wall 66, outer side wall 71 and a bottom wall 52, which together define an inner receiving space 73 for the capsule 26. The internal side wall 66 is configured to match the shape of the capsule 26 in order to achieve a snug fit between the capsule 26 and the inner wall 66 of the capsule holder. The internal side wall 66 can be straight or tapered as illustrated in FIG. 4a. The outer side wall 71 and the inner wall 66 of the capsule holder 10 may be produced in one single part or two different parts.

Figure 5A:
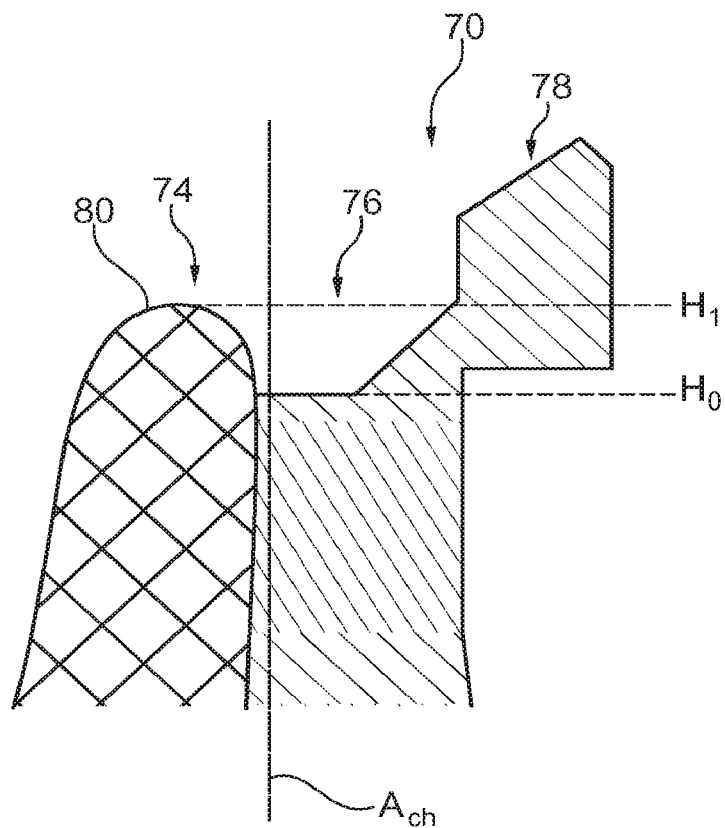
Figure 5B:
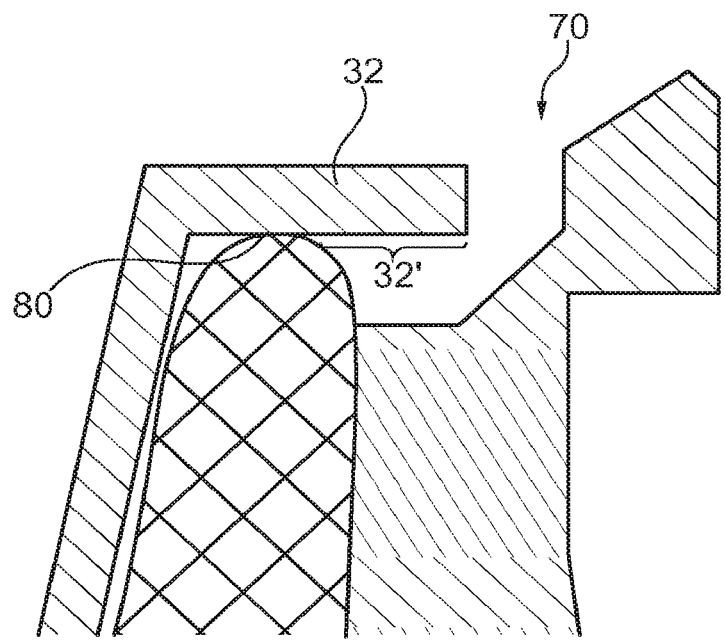

Now referring to FIGS. 5a and 5b, the upper rim 70 of the capsule holder 10 has an inner annular portion 74, a mid annular portion 76 and an outer annular portion 78. The inner annular portion 74 is connected to the internal side wall 66 of the capsule holder 10 and has a ridge 80 protruding in the axial direction of the capsule holder $A_{ch}$. As illustrated in FIG. 5b, the ridge 80 is configured to abut the underside of the capsule rim 32 and to restrict movement of the capsule further into the capsule holder.

The mid annular portion 76 has a depressed surface located at a height $H_0$ which is lower than the height $H_1$ of the ridge 80. Hence, when a capsule 26 is placed in the capsule holder 10, the capsule rim 32 is not in contact with the mid annular portion 76. The mid annular portion 76 may also have an upwardly tapered surface portion in the radial direction of the capsule holder.

The outer annular portion 78 is located at the outermost position in the radial direction of the capsule holder 10. The outer annular portion preferably has a funnel portion inclined toward the center of the capsule holder 10 configured to guide the capsule and/or injector head 28 into the capsule holder such that the injection plate 27 is aligned and centered with respect to the capsule lid.

The bottom wall 52 of the capsule holder 10 comprises an extraction plate 54, a liquid diverting chamber 60 and an outflow collector chamber 64. The extraction plate 54 is provided with outflow spikes 56 and apertures which form extraction outflow channels 62 through the extraction plate 54. The outflow spikes 56 have a sharp tip configured to pierce open the bottom wall 15 of the capsule 26. The upper rim 70 of the capsule holder is configured to be received in a guide slot 46 in the housing 40. As best seen in FIGS. 3*a*-3*c*, the housing 40 is configured to slideably receive a capsule 26 in a guide slot 46. The guide slot 46 is formed by an upper flange 47 and a lower flange 48 which partially extend over the upper and the lower side of the capsule rim 32.

Optionally, the capsule holder 10 may be provided with a friction grip 68 arranged on the outer side wall 71 of the capsule holder 10 in order to ensure that the user can firmly grip the capsule holder 10 when inserting and removing the capsule holder into the extraction block 8.

As best seen in FIGS. 7*a*, 7*b*, 8*a* and 8*b*, the liquid injection mechanism 4 further comprises a capsule disengaging mechanism. The capsule disengaging mechanism 82 comprises a clasp 85 fixed to the injector head 28, configured to engage an underside of the rim of the capsule when the injector head and capsule holder are in the closed position. In use, when the injector head 28 is moved in the axial direction Ach towards the lid of the capsule 26, the clasp 85 contacts with it is leading edge 85*a* the outer edge 32' of the capsule rim 32 and moves underneath the capsule rim outer edge such that the trailing edge 85*b* of the clasp 85 engages the underside of the capsule rim outer edge. The difference in height $H_0$–$H_1$ between the mid annular portion 76 and the ridge 80 of the capsule holder is greater than an axial height of a clasp 85 in order to allow the clasp to be positioned in the space formed under the outer edge of the capsule rim.

The flexibility of the capsule rim enables the clasp to slide under the capsule rim 32. When the injector head 28 retracts from the capsule holder 10, the clasp 85 engaging the underside of the capsule rim outer edge lifts the capsule up from the capsule holder 10 such that the capsule disengages from the grasp of the capsule holder, without however being removed from the capsule holder. In effect, during injection of hot water under pressure into the capsule, the capsule bottom wall 15 is pressed against and perforated by the extraction plate 52, and the capsule sidewall 25 expands and presses against the capsule holder inner side wall 66. The capsule thus "sticks" to the capsule holder by frictional grasp and is difficult to dislodge from the capsule holder after use. The capsule disengaging mechanism 82 thus serves to dislodge or disengage the capsule from the frictional grasp of the capsule holder after use (i.e. preparation of a beverage).

The housing 40 may comprise a flange which restricts disengagement movement of the capsule 26 past a certain height in the housing 40 while the capsule holder 10 is mounted to the injection block 9. When the capsule lifts up and abuts the flange, and the moveable block 8 continues to move open away from the capsule holder, the clasp 85 disengages from the capsule due to the deformation of the flexible capsule rim as the clasp is lifted away with the moveable block.

Once the capsule holder 10 is removed from the injector head, the dislodged capsule 26 can be easily tipped out of the capsule holder by gravity without the need for applying a further force or ejection mechanism.

The capsule holder rim only abuts the capsule rim 32 on the ridge 80 of the inner annular portion 74 of the rim 70. As the mid annular portion 76 of the capsule holder rim 70 is depressed in relation to the ridge 80, the outer edge 32' of the capsule rim 32 is arranged at a distance from the rim and defines a void under the capsule rim 32. The void enables the capsule rim 32 to flex downwardly as the clasp 82 is urged against the capsule rim 32.

In an embodiment (not shown), the clasp can be integrally formed with the body of the moveable block 88, for instance by being formed as a single molded or machined piece with the block 88. In another embodiment, the clasp may be a separate part assembled to the moveable block, for instance by bonding, welding, screwing, interference fit or other known fixing means.

In an exemplary embodiment, the clasp may be formed on a head 83 of a shaft 84. In this embodiment, the shaft 84 may be screwed or inserted in an interference fit in a fixing cavity of the injector head 28, and the head 83 is arranged at a free end of the shaft pointing in the axial direction towards the capsule holder. In this embodiment the clasp may advantageously be axisymmetric such that the shaft may be inserted in the fixing cavity without needing to consider the rotational angle of the shaft.

In the illustrated embodiment, the head 83 has an essentially planar and annular trailing edge 85 *b* extending in a transverse direction in relation to the axis As of the shaft 84. The head may advantageously have a conical of curved leading edge 85 *a*. Alternatively, the clasp may have a head without a transversely extended portion, but instead be provided with a friction engaging surface that frictionally grasps the outer portion of the capsule rim. Various other clasp shapes that allows engaging, respectively disengaging the flexible capsule rim during closing, respectively opening of the extraction block may be provided.

In an advantageous embodiment, the capsule disengaging mechanism 82 comprises a pair of clasps 85 on diametrically opposite sides of the injector head such that the capsule rim is grasped on opposite sides. The pair of clasps 85 in the illustrated embodiment are separated by an angle of 180° or approximately 180° around the injector head.

In variants, more than two clasps may be arranged around the circumference of the injector head, in a regular angle spaced relationship, or a plurality of clasps (e.g. two) may be positioned close together on one side of the injector head and another one or plurality on a diametrically opposed side of the injector head.

The radial distance of the clasps from the centre axis of the capsule holder corresponds to the outer radius of the capsule rim less a small amount configured for an interference engagement of the clasp with the rim. The interference overlap amount of the clasp and outer edge of the capsule rim may advantageously be in the range of between 0.3 mm and 2 mm, preferably in a range of between 0.4 mm and 1 mm, more preferably between 0.4 and 0.8 mm.

Figure 6:
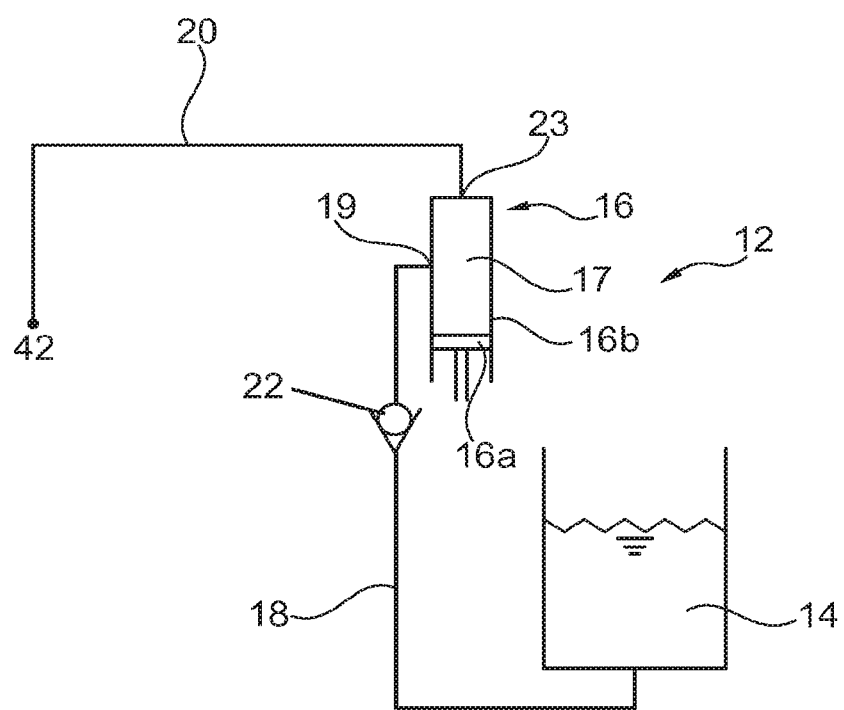
FIG. 6 is a schematic diagram view of an exemplary liquid supply system of an apparatus according to an embodiment of the invention.
Figure 7A:
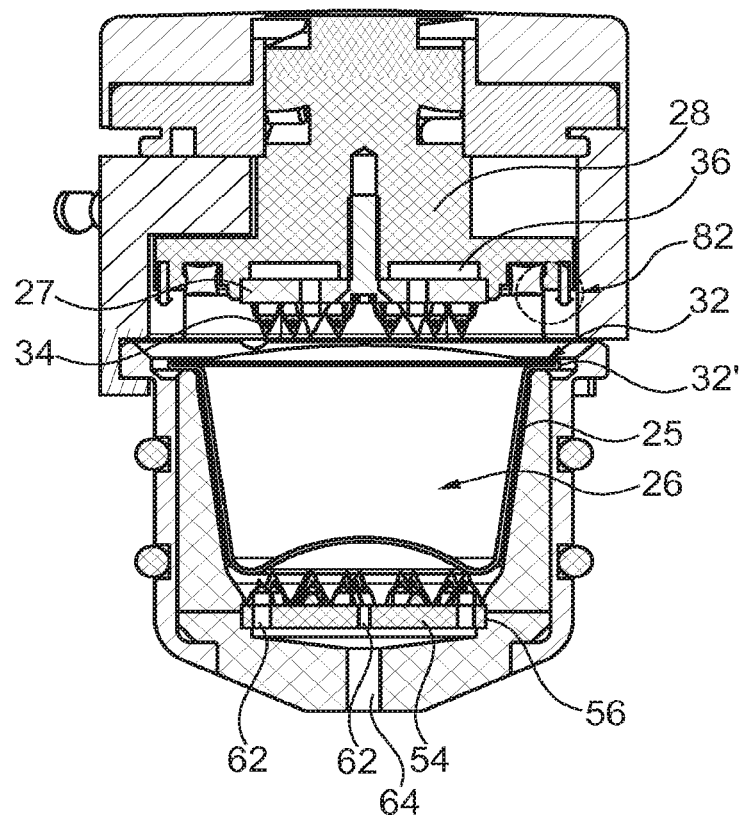
FIG. 7a is a schematic cross-sectional view of an extraction block with a capsule and a capsule disengaging mechanism in an open position before injection, according to an embodiment of the invention.
Figure 7B:
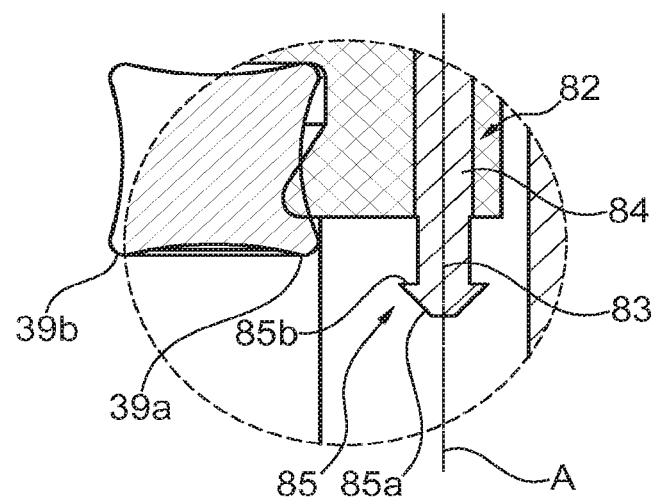
FIG. 7b is a detailed schematic cross-sectional view of the ejection mechanism before ejection.
Figure 8A:
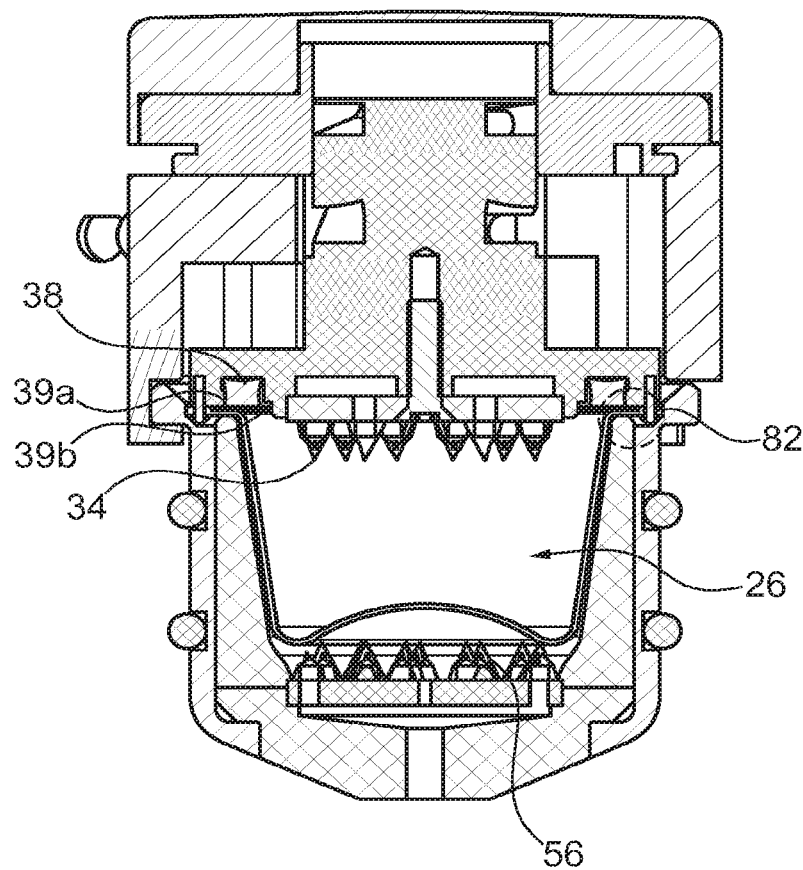
FIG. 8a is a schematic cross-sectional view of an extraction block with a capsule and a capsule disengaging mechanism in a closed position before injection, according to an embodiment of the present invention.
Figure 8B:
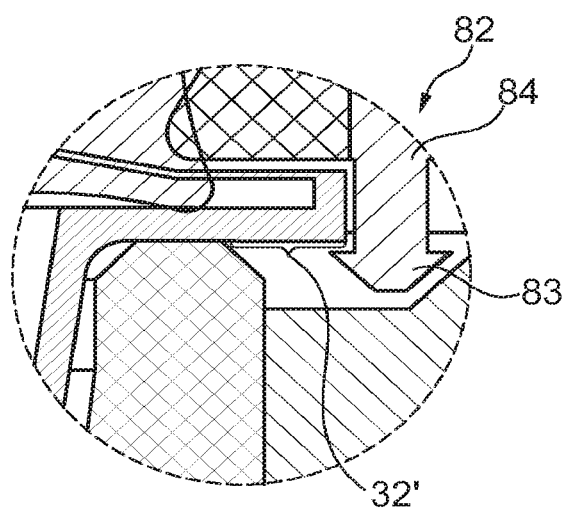
FIG. 8b is a detailed schematic cross-sectional view of the ejection mechanism when the extraction block is closed.

As best seen in FIGS. 1*a*, 1*b* and 6, the liquid supply system 12 comprises a water reservoir 14 and a pump 16. The pump 16 is configured to draw liquid from the water reservoir 14 and supply the water to the inlet injectors 34 in the injection head 9. In an advantageous embodiment, the pump 16 is a piston pump comprising a piston 16 *a* arranged inside a cartridge 16 *b*. The pump is upstream connected to the water reservoir via a first conduit 18, which supplies liquid to a pump chamber 17 in the pump 16 via an inlet 19. A one-way valve 22 is arranged on the first conduit 18 or in the inlet 19 to the pump chamber 17. The one-way valve 22 blocks the liquid in the pump chamber 17 from flowing back to the water reservoir 14. A second conduit 20 is arranged from an outlet 23 from the pump chamber to the water inlet 42 of the housing 40 of the extraction block 8.

In use, the piston 16*a* of the pump 16 first performs a retraction movement, whereby liquid from the water reservoir 14 enters through the inlet 19 and is drawn into the pump chamber 17. Additionally, the retraction movement of the piston 16 *a* also creates an under-pressure in the second conduit 20 when the extraction block is closed and the switchable inlet channel in the injector head is aligned with the water inlet 42 in the housing 40 of the injection block 9. The under-pressure in the second conduit draws liquid from the distribution chamber 36 and inlet injectors 34, such that an under-pressure is created in the capsule 26. Consequently, the under pressure in the capsule 26 achieves a small return-flow of liquid from the inside of the capsule 26 to the distribution chamber 36. The under pressure in the second conduit 20, distribution chamber 36 and injector side of the capsule is maintained while the extraction block is closed because the wet bed of substance within the capsule, for instance the wet coffee grind, acts as a resistance that restricts the backward flow of liquid from the extraction plate 54 towards the injector head. The volume of liquid drawn back due to the under-pressure as the pump chamber is being filled, may be configured by adjusting the resistance against flow in the second channel taking into account the level of under-pressure and the resistive effect of the capsule wet substance. The volume of liquid drawn back may be adjusted such that the few drops that remain on the injector side, respectively on the extraction side of the capsule, as well as on the injection plate 27 and capsule holder outflow collector chamber 64 are drawn back to prevent drops of liquid falling when the beverage preparation cycle is completed and the capsule holder released and removed from the extraction block. By drawing back with under-pressure a few drops of liquid at the end of the beverage preparation, unwanted discharge of liquid from the extraction block 8 after the drink has been prepared is prevented.

When the moveable block is opened, the switchable inlet channel 31 moves out of fluid communication with the stationary channel 42 and seals the switchable inlet channel such that the liquid in the distribution chamber 36 is retained in the distribution chamber and does not drop out through inlet injectors 34.

In a following beverage preparation cycle, the piston performs a compression movement, whereby liquid in the pump chamber is urged through the outlet 23 from the pump chamber to the water inlet 42. The one-way valve on the first conduit 18 prevents the liquid in the pump chamber from flowing back to the water reservoir.

An annular sealing 38 is received in an annular slot in the injector head axially aligned with the ridge 80 of the capsule holder 10. The annular sealing 38 seals the capsule lid 30 against the injector head 28, such that liquid from the injection head 9 cannot circumvent the capsule lid 30 and the injection pressure during beverage preparation as well as the under pressure at the end of beverage preparation is maintained between the injector head 28 and the capsule 26.

The sealing 38 comprises an elastic material such as rubber or silicone. Preferably, the sealing 38 has an outer lip 39a and an inner lip 39b. The outer lip 39a is essentially axially aligned with the ridge 80 of the capsule holder 10 and the inner lip 39b may be located radially inwards of the outer lip 39a, configure to press against the lid of the capsule. The double sealing lip may advantageously be provided in the form of an essentially square or "X" shaped sealing ring, which provides an effective sealing function that better adjusts for tolerances in the relative closing position between the moveable block and capsule holder than a simple O-ring.

The main body 2 may house parts of the liquid supply system. Additionally, a user interface 3 may be located on the main body to set the beverage preparation parameters and to provide feedback to the user. The main body may also comprise a plate 5 for placing a recipient, such as a coffee cup.

LIST OF REFERENCES IN THE FIGURES apparatus for producing a beverage 1
    main body 2
        user interface 3
        plate 5
    extraction block 8
        injection block 9
            liquid injection mechanism 4
                moveable injector head 28
                    switchable inlet channel 31
                        first end opening 33
                        second end end opening 35
                injection plate 27
                    inlet injectors 34
                      spike
                        tip 29
                        micro channel 37
                distribution chamber 36
            annular sealing (sealing off the lid of the capsule) 38
        housing 40
            water inlet 42
            seal 44
            guide slot 46
                upper flange (restricts movement of the capsule higher) 47
                lower flange 48
    actuating mechanism (for opening the extraction chamber) 50
    extraction mechanism 6
        capsule holder 10
            bottom wall 52
                extraction plate 54
                    outflow spikes 56
                liquid diverting chamber 60
                extraction outflow channels 62
                outflow collector chamber 64
            side walls 66
            outer side wall 71
            inner receiving space 73

-continued

```
            grip (friction surface) 68
            rim 70
                inner annular portion 74
                a mid annular portion 76
                an outer annular portion 78
        capsule disengagement mechanism 80
            clasp 82
                head 83
                shaft 84
        liquid supply system 12
            water reservoir 14
            first conduit (water reservoir to pump) 18
            one-way valve 22
            second conduit (pump to injector head) 20
            water inlet 42
        pump 16
            pump chamber 17
                piston 16a
                cartridge 16b
capsule 26
    sidewall 25
        lid 30
        rim 32
            outer edge 32'
axial direction A
```

The invention claimed is:

1. An apparatus for preparing a beverage from capsules, including:

a liquid supply system comprising a water reservoir and a pump;

an extraction block comprising an injection block including a movable injector head and a housing; and an extraction mechanism comprising a capsule holder configured to receive a capsule, the injector head comprising an injection plate having a plurality of inlet injectors with internal liquid channels configured to pierce through a lid of the capsule, the injection block comprising a water inlet connected to the water reservoir and an actuating mechanism configured to displace the injector head between an open position in which the capsule can be inserted or removed from the extraction block, to a closed position in which the injector head is sealingly closed against the capsule holder;

wherein the pump comprises a pump chamber and being configured to draw liquid from the water reservoir into the pump chamber via a first conduit comprising a valve preventing the liquid in the pump chamber from flowing back to the water reservoir, and further configured to supply the liquid in the pump chamber to the inlet injectors via a second conduit fluidly connecting an outlet of the pump chamber to the water inlet during a pump chamber filling operation such that an under pressure in the inlet injectors is created, the under pressure returns the liquid from an inside of the capsule to a liquid distribution chamber;

wherein the injector head comprises a switchable inlet channel having a first end opening arranged to receive liquid from the water inlet of the housing and a second end opening arranged to supply liquid from the first opening to the inlet injectors, and wherein in the closed position the water inlet of the housing is in liquid communication with the switchable inlet channel, and in the open position the water inlet is sealingly closed.

2. An apparatus for preparing a beverage from capsules, comprising:

a liquid supply system; and an extraction block having an injection block and an extraction mechanism comprising a capsule holder configured to receive a capsule, the injection block comprising an injector head movably mounted in a housing comprising a water inlet connected to an upstream water reservoir, the injector head comprising an injection plate having a plurality of inlet injectors with internal liquid channels configured to pierce through a lid of the capsule;

wherein the injection block further comprises an actuating mechanism configured to displace the injector head between an open position whereby the capsule can be inserted or removed from the extraction block to a closed position whereby the injector head is closed against the capsule holder, wherein the injector head comprises a switchable inlet channel having a first end opening arranged to receive liquid from the water inlet and a second end opening arranged to supply liquid from the first opening to the inlet injectors, and wherein in the closed position the water inlet is in liquid communication with the switchable inlet channel, and in the open position the water inlet is sealingly closed.

3. The apparatus according to claim 2, wherein a sealing ring is provided around the water inlet at an interface with the injector head, such that when the injector head is in the open position, the sealing ring presses sealingly against a closed portion of a lateral surface of the injector head to thereby close the water inlet, and in the closed position the sealing ring presses sealingly against the lateral surface of the injector head surrounding the switchable inlet channel such that a sealed coupling between the water inlet and the switchable inlet channel is provided.

4. The apparatus according to claim 2, wherein the pump is a piston pump comprising a reciprocating piston arranged within a cartridge enclosing the pump chamber.

5. The apparatus according to claim 2, wherein a one-way valve is arranged in the first conduit to prevent the liquid in the pump chamber from flowing back to the water reservoir.

6. The apparatus according to claim 2, wherein the liquid distribution chamber is arranged in the injector head adjacent the injection plate and configured to distribute liquid to the inlet injectors.

7. The apparatus according to claim 2, wherein an upper rim of the capsule holder has an inner annular portion connected to an inner side wall of the capsule holder and a mid annular portion extending radially outwards of the inner annular portion, the inner annular portion comprising a ridge protruding in an axial direction of the capsule holder $A_{ch}$, configured to abut an underside of the capsule rim, and wherein the mid annular portion has a surface located at a height $H_0$ lower than a height $H_1$ of the ridge such that when the capsule is placed in the capsule holder, the capsule rim is not in contact with the mid annular portion.

8. The apparatus according to claim 2, further comprising a capsule disengaging mechanism that comprises a pair of clasps on diametrically opposite sides of the injector head.

9. The apparatus according to claim 2, wherein the capsule holder has a rim configured to support an underside of a capsule rim, the rim of the capsule holder comprising an inner annular portion shaped as a ridge configured for abutting against the underside of the capsule rim.

10. The apparatus according to claim 9, wherein a sealing ring is received in a slot in the injector head axially aligned with the ridge of the capsule holder, the sealing ring comprising a double lip facing the capsule lid, an outer lip of the sealing ring positioned axially above the ridge.

11. The apparatus according to claim 2, further comprising a capsule disengaging mechanism configured to engage a rim of the capsule and lift up the capsule when a movable part of the injector head and the capsule holder move from the closed position to the open position, wherein the capsule disengaging mechanism comprises a clasp fixed to the injector head configured to interfere with an outer edge of the capsule rim and deform the capsule rim during closing of the injector head, the clasp further configured to lift up the capsule and to disengage from the capsule due to the deformation of the flexible capsule rim as the clasp is lifted away with the injector head.

12. The apparatus according to claim 11, wherein the clasp comprises a leading edge configured to interfere with the outer edge of the capsule rim and to deform the capsule rim to enable the clasp to slide past and under said outer edge such that a trailing edge of the clasp engages an underside of the capsule rim outer edge.

13. The apparatus according to claim 11, wherein the housing comprises a flange which restricts disengagement movement of the capsule while the capsule holder is mounted to the injector head such that when a moveable block opens away from the capsule holder the capsule lifts up and abuts the flange and the clasp disengages from the capsule due to the deformation of the flexible capsule rim.

14. The apparatus according to claim 11, wherein a radial position of the clasp from a centre axis of the capsule holder corresponds to an outer radius of a capsule rim less an interference amount configured for an interference engagement of the clasp with the rim, the interference amount in the range of between 0.3 mm and 2 mm.

* * * * *